(12) United States Patent
Hassan et al.

(10) Patent No.: US 10,320,988 B2
(45) Date of Patent: *Jun. 11, 2019

(54) DATA CENTER SELECTION BASED ON EFFECTIVE DISTANCES

(71) Applicant: Microsoft Technology Licensing, LLC, Redmond, WA (US)

(72) Inventors: Amer Hassan, Kirkland, WA (US); Gareth Lyndon Eadred Bridges, Redmond, WA (US); Bradford R. Clark, Broomfield, CO (US); Timothy R. Allen, Livermore, CA (US); Russell Andrew Penar, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,896

(22) Filed: Jul. 27, 2018

(65) Prior Publication Data

US 2018/0338044 A1    Nov. 22, 2018

Related U.S. Application Data

(63) Continuation of application No. 15/341,633, filed on Nov. 2, 2016, now Pat. No. 10,038,792.

(51) Int. Cl.
*H04M 3/42* (2006.01)
*H04M 7/00* (2006.01)
*H04M 3/56* (2006.01)
*H04L 12/18* (2006.01)

(52) U.S. Cl.
CPC .......... *H04M 3/56* (2013.01); *H04L 12/1818* (2013.01); *H04L 12/1822* (2013.01); *H04L 12/1827* (2013.01); *H04M 2203/5063* (2013.01)

(58) Field of Classification Search
CPC .......... H04M 3/56; H04M 3/567; H04M 7/00
USPC ............ 379/202.01, 207.12, 212.01, 221.01, 379/221.04, 221.02, 220.01, 219
See application file for complete search history.

(56) References Cited

U.S. PATENT DOCUMENTS 9,167,098 B1 * 10/2015 Anderson .......... H04L 12/1827
9,282,130 B1 * 3/2016 Goepp ................ H04L 12/1818

\* cited by examiner

*Primary Examiner* — Thjuan K Addy (57) ABSTRACT

An initial data center can be selected to host a communication session between multiple participants. This data center can be initially selected based, at least in part, on a first set of effective distances (e.g., representing distances between the initial data center and the first group of participants modified by effective distance factors). For example, the data center closest to the centroid can be selected. The effective distance factor (or weighting) can be based on one or more of the participant's device/driver type, the participant's network type, the participant's connection type, and a participant weighting factor. Then, as the multiple participants on the conference session change or the effective distances change (e.g., based on a change in connectivity), a second data center can be selected to host the communication session.

20 Claims, 6 Drawing Sheets

DATA CENTER SELECTION BASED ON EFFECTIVE DISTANCES

CROSS-REFERENCE TO RELATED APPLICATIONS

This application is a continuation of U.S. patent application Ser. No. 15/341,633, filed on Nov. 2, 2016, which is hereby incorporated by reference in its entirety for all purposes.

BACKGROUND

Online conferencing (a.k.a., web conferencing and/or internet conferencing) systems have an array of capabilities including voice/video communications, instant messaging, data/application sharing, and white-boarding. These online collaborative service systems enable users to engage in communication sessions to exchange different types of communication media, such as voice data, video data, content sharing, and combinations thereof. Some conferencing systems enable users to share and collaborate in creating and modifying documents or other shared content. Online conferencing typically allows real-time point-to-point communication as well as multicast communications (i.e., from one sender to many receivers). Some services offer data streams of voice and/or video chat to be shared simultaneously, across geographically dispersed locations. Applications for online conferencing include meetings, training events, lectures, and presentations.

SUMMARY

Examples discussed herein relate to systems and methods for selecting data centers to host a communication session. Some embodiments include a management system configured to manage data centers hosting a communication session among a plurality of participant devices. The management system can also include a data center selection system. The data center selection system can include a processor and a memory having stored thereon instructions that when executed by the one or more processors cause the data center selection system to select a first data center from the plurality of data centers to initially host the communication session. The initial selection can be based on a first set of effective distances between a first group of participants and the first data center. The data center selection system can also select (e.g., in response to a detection of change in participant composition of the group of participants or change in connectivity between the multiple participant devices and the first data center) a second data center to host the communication session based on a second set of effective distances.

Some embodiments include a method for operating a communication system. An initial data center can be selected to initially host a communication session between a first group of participants. The initial data center can be selected to initially host the communication session based, at least in part, on a first set of effective distances. A second data center can be selected to host the communication session based on an updated set of effective distances between a second group of participants and the second data center.

Some embodiments provide for a system that includes a means for determining effective distance information about each of a plurality of participants that are participating in a communication session. The effective distance information can associate each combination of each of the plurality of participants and a plurality of data centers to a respective effective distance indicator. The system can also include a means for selecting a data center to host the communication session based on the effective distance indicators.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Participants in an online conference call may join or leave while the call is in progress. If significant geographical or connectivity changes occur in the makeup of the participants in a call occur, there may be a better (e.g., faster, better quality, more efficient) data center than the current one to host the call. Likewise, if important participants (e.g., presenters, high-level executives, remote auditorium, etc.) join or leave the call, the call may be better hosted by a different (i.e., better) data center.

In an embodiment, an initial data center is selected to host the online conference. This data center can be selected based on the geographical locations of the participants. Typically, the data center closest to the centroid (i.e., geometric center, or 'center of mass') of the participants is selected. During (or before) the conference call, an 'effective' centroid is calculated based on effective distances. Effective distances are based on a combination of the physical distance between a participant and a data center, and an effective distance factor (or weighting) that is based on one or more of the participant's device/driver type (e.g., a Windows Phone vs. another brand/type), the participant's network type (e.g., open WiFi hotspot vs. home WiFi hotspot), the participants connection type (e.g., wired vs. wireless, or LTE vs. CDMA), and a participant weighting factor (e.g., media presenter vs. listen-only participant.) These effective distance factors help compensate for the different characteristics of participants/devices/networks that are not typically accounted for by a 'distance only' calculation of the centroid.

It should be understood that in the following discussion of the various embodiments, the term 'conference call' is used for convenience. The term 'conference call' includes any type of media hosting such as Skype for Business, PSTN conferencing, webcasts, mobile device conferencing, internet radio, etc.

Figure 1A:
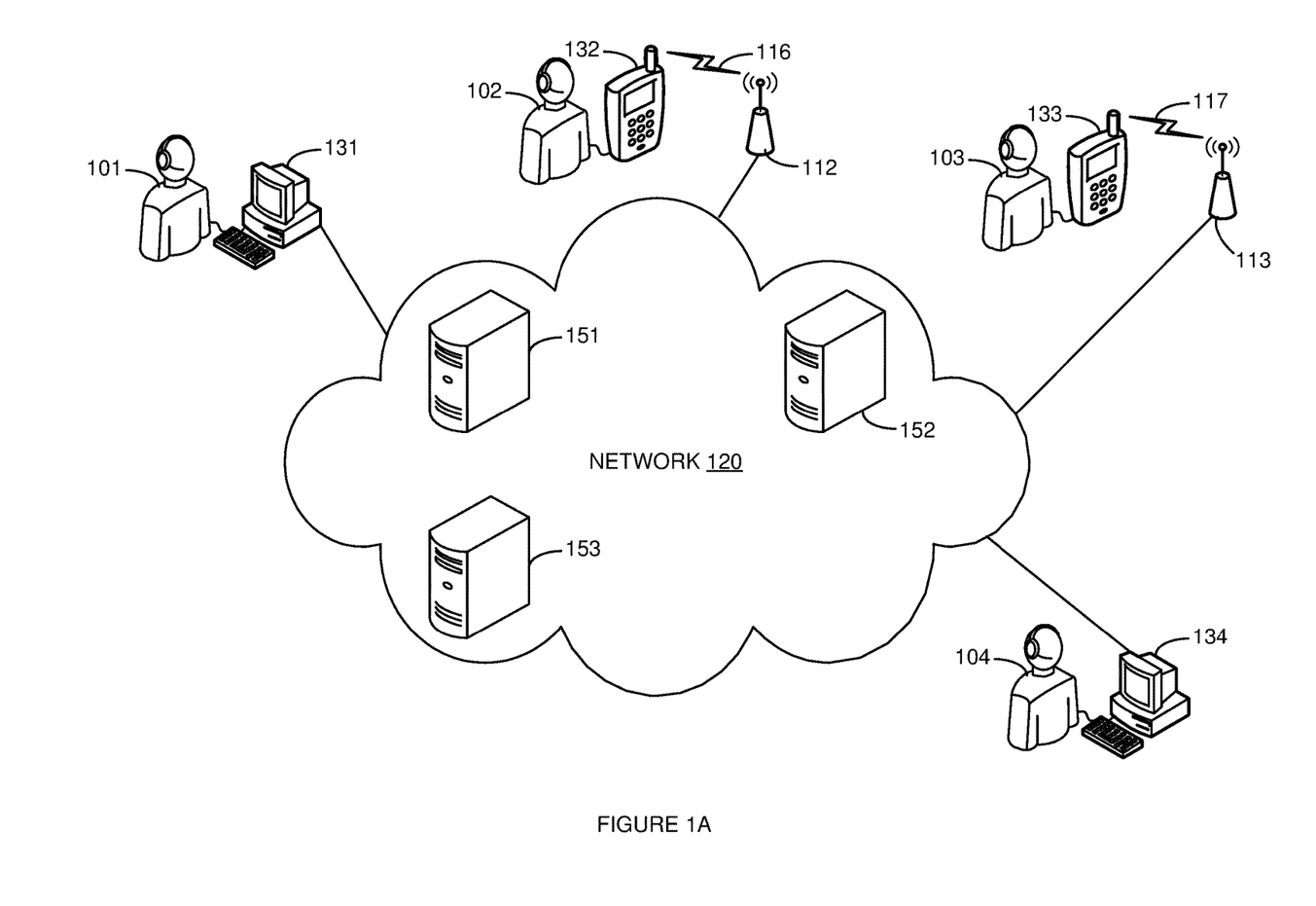
FIG. 1A is a block diagram illustrating an online conferencing system.

FIG. 1A is a block diagram illustrating an online conferencing system. In FIG. 1A, conferencing system 100 comprises participants 101-104, client devices 131-134, network 120, and data centers 151-153. Participants 101-104 use a software program deployed on client devices 131-134, respectively, to participate in an online conference hosted by a selected one of data centers 151-153. Client devices 131-134 are operatively coupled to network 120. Network 120 includes, or is operatively coupled to, data centers 151-153. Thus, participants 101-104, via client devices 131-134, network 120, and a selected data center 151-153 are able to join, leave, receive, and participate in, an online conference call.

Network 120 is a wide area communication network that can provide wired and/or wireless communication with data centers 151-153 by client devices 131-134. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, internet routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof.

Other network elements may be present in network 120 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of conferencing system 100 which are omitted for clarity, including additional computing devices, client devices, access nodes, routers, gateways, and physical and/or wireless data links for carrying data among the various network elements.

Client devices 131-134 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser and/or conferencing software (for example, the Skype™ app from Microsoft) in order to participate in a conference hosted by a data center 151-153. Other types of communication platforms are possible. An example device that may be, comprise, and/or include a client device 131-134 include, but are not limited to, example computer system 500 (described herein with reference to FIG. 5).

In an embodiment, conferencing system 100 selects from among data centers 151-153 an initial data center to host a conference call. This selection may be made by one or more of data centers 151-153, an element of data centers 151-153, or another system not shown in FIG. 1 (e.g., a data center selection and/or handoff system residing at and/or coupled to a data center 151-153.) This selection is based at least in part on the locations of the initial participants 101-104.

In an embodiment, the selection of an initial data center may be based on a centroid calculated from the locations of participants 101-104 (as reflected and/or reported by the locations of client devices 131-134.) In an embodiment, the selection of an initial data center may be based on an effective centroid calculated from the locations of participants 101-104 and an effective distance factor. This effective distance factor may be based on one or more of a participant's device/driver type, the participant's network type, the participants connection type, and a participant weighting factor.

Examples of device/driver types that may, at least in part, be accounted for by the effective distance factor include whether the device has the latest driver and/or software, the type of operating system running on the device (e.g., Windows vs. Linux), and the device's hardware capability (e.g., 100 MHz processor vs. 1 GHz processor and/or the amount of memory), etc. Examples of network types that may, at least in part, be accounted for by the effective distance factor include whether the participant's device is connected via an open or public Wifi hotspot, or whether the device is connected via a 'partner' hotspot that is optimized to carry real-time (e.g., conference call) traffic. Examples of connection types that may, at least in part, be accounted for by the effective distance factor include wired connections, wireless connections, and the wireless technology (e.g., LTE, CDMA, WiFi, etc.), if any, being used.

Figure 1B:
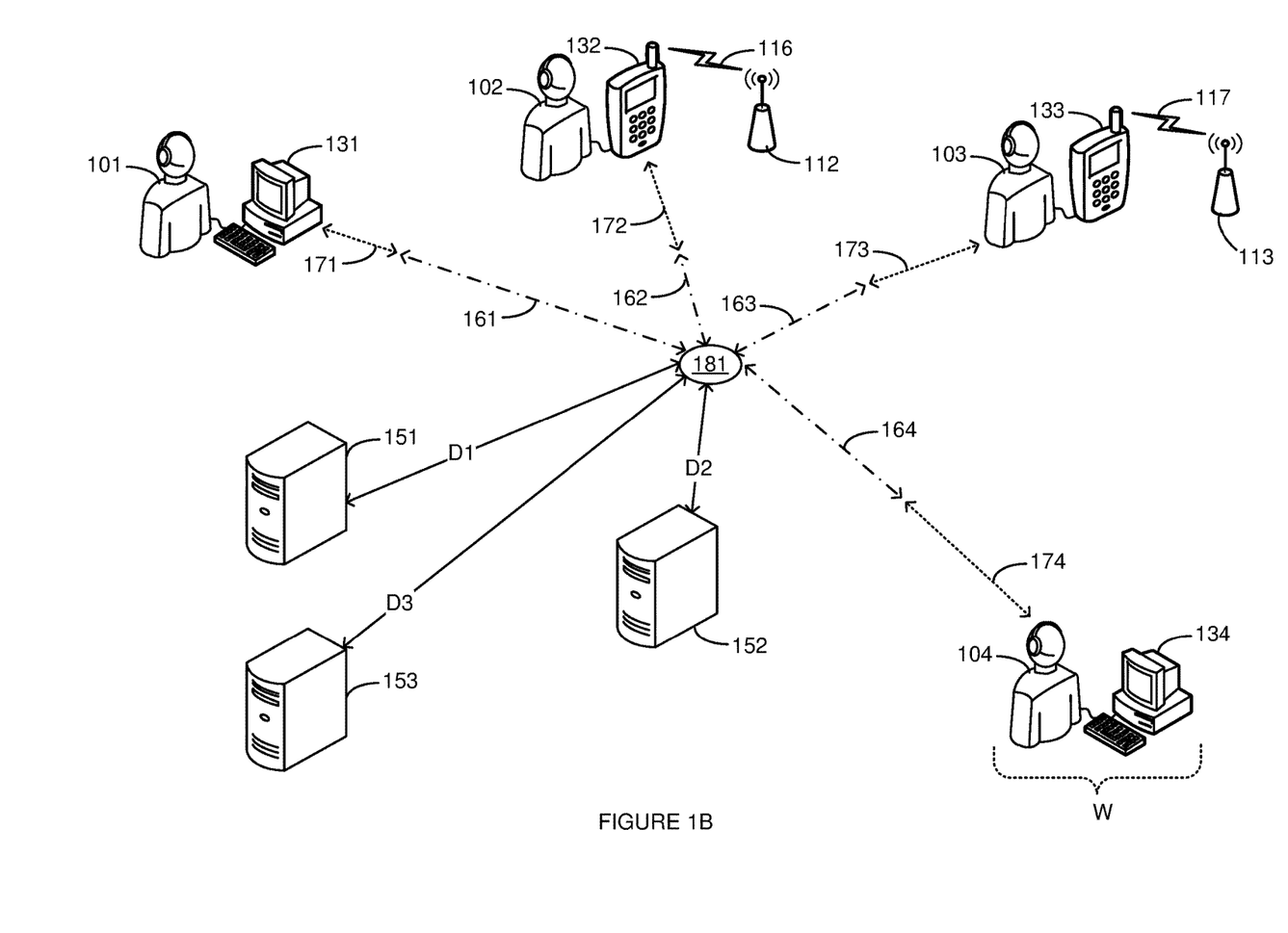
FIG. 1B is an illustration of an effective distance centroid of an online conference.

FIG. 1B is an illustration of an effective distance centroid of an online conference. FIG. 1B illustrates conferencing system 100. For clarity purposes, network 120 is not illustrated in FIG. 1B (though it should be understood that, as illustrated in FIG. 1A, network 120 is still part of conferencing system 100).

In FIG. 1B, the effective centroid 181 of client devices 131-134 (and therefore the effective locations of participants 101-104) is illustrated. Effective centroid 181 is a weighted average of effective geometric distances.

The contribution of the locations of client devices 131-134 to the location of effective centroid 181 are illustrated in FIG. 1B by arrows 161-164, respectively. Arrows 161-164 are illustrated running part-way between respective client devices 131-134 and effective centroid 181. The contributions of the effective distance factors associated with client devices 131-134 to the location of effective centroid 181 are illustrated in FIG. 1B by arrows 171-174, respectively. Thus, the total contribution to the location of effective centroid 181 by client device 131 is the geographic distance illustrated by arrow 161 and the effective distance factor illustrated by arrow 171. Likewise, the total contribution to the location of effective centroid 181 by client device 132 is the geographic distance illustrated by arrow 162 and the effective distance factor illustrated by arrow 172. The total contribution to the location of effective centroid 181 by client device 133 is the geographic distance illustrated by arrow 163 and the effective distance factor illustrated by arrow 173. The total contribution to the location of effective centroid 181 by client device 134 is the geographic distance illustrated by arrow 164 and the effective distance factor illustrated by arrow 174.

Client device 131 is illustrated in FIG. 1B as a desktop computer. Thus, for example, the effective distance factor illustrated in FIG. 1B by arrow 171 would be based at least in part on typical characteristics of a desktop computer. Client device 132 is illustrated in FIG. 1B as a wireless device that is connected via wireless link 116 and WiFi access point 112. Thus, for example, the effective distance factor illustrated in FIG. 1B by arrow 172 would be based at least in part on the characteristics of the type of wireless device (e.g., brand, model, operating system) corresponding to client device 132 and the type of network provided by WiFi access point 112. Client device 133 is illustrated in FIG. 1B as a wireless device that is connected via wireless link 117 and base station 113. Thus, for example, the effective distance factor illustrated in FIG. 1B by arrow 173 would be based at least in part on the characteristics of the type of wireless device (e.g., brand, model, operating system) corresponding to client device 133, and the type of network provided by access point node 113, and the type of wireless connection 117 (e.g., LTE, CDMA, etc.) being used by client device 133 and access node 113. Client device 134 is illustrated in FIG. 1B as a desktop computer associated with a weighting factor (W). Thus, for example, the effective distance factor illustrated in FIG. 1B by arrow 171 would be based at least in part on typical characteristics of a desktop computer and an additional weighting factor. This additional weighting factor may be assigned based on a relative importance associated with participant 104 (and/or client device 134), whether participant 104 is or will be sharing video or other resource intensive content/media, whether participant 104 is the meeting host, or whether participant 104 otherwise merits greater (or lesser) performance.

The distances between data centers 151-153 and effective centroid 181 is illustrated in FIG. 1B by arrows D1, D2, and D3, respectively. Arrows D1, D2, and D3 are illustrated as running between respective data centers 151-153 and effective centroid 181. Thus, in FIG. 1B, D1 is the distance between data center 151 and effective centroid 181; D2 is the distance between data center 152 and effective centroid 181; and D3 is the distance between data center 153 and effective centroid 181. In FIG. 1B D2 is less than D1 and D1 is less than D3. Thus, system 100 would select data center 152 to host the conference call based on data center 152 being closest to effective centroid 181 in FIG. 1B.

Figure 2:
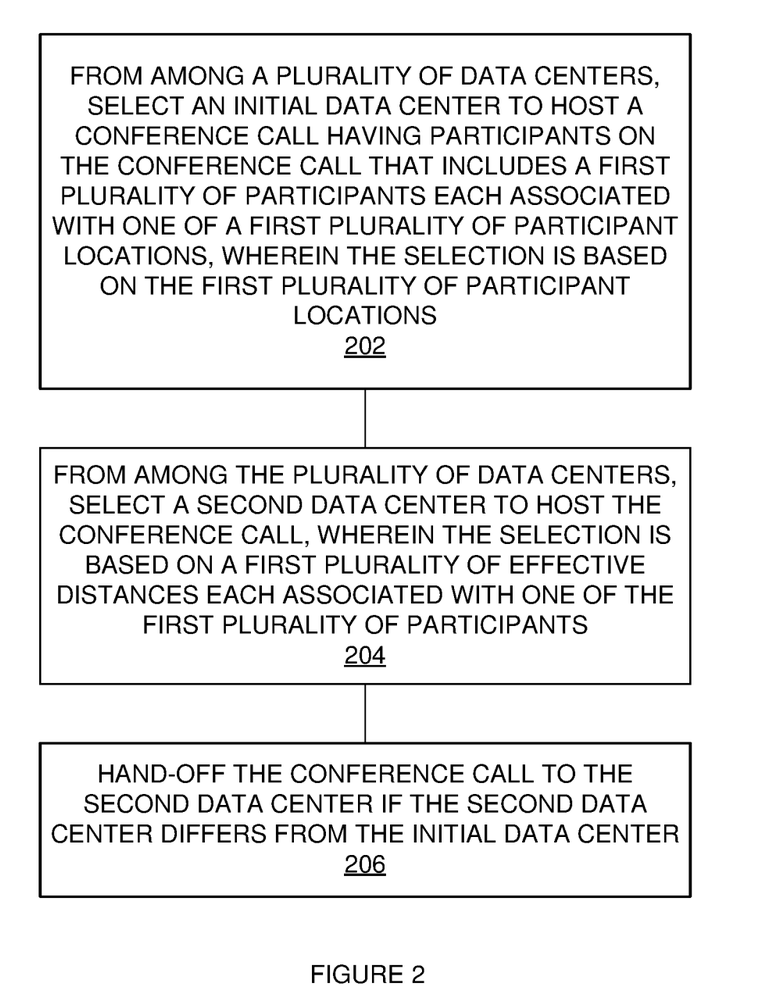
FIG. 2 is a flowchart illustrating a method of handing-off an online conference based on effective distances.

FIG. 2 is a flowchart illustrating a method of handing-off an online conference based on effective distances. The steps illustrated in FIG. 2 may be performed by one or more elements of conferencing system 100. From among a plurality of data centers, an initial data center is selected to host a conference call that includes a first plurality of participants. The first plurality of participants are each associated with one of a corresponding first plurality of locations. The selection being based on the first plurality of participant locations (202).

For example, conferencing system 100 may select, from among data centers 151-153, an initial data center (e.g., data center 151) to host a conference call. This selection may be made by one or more of data centers 151-153, an element of data centers 151-153, or another system not shown in FIGS. 1A-1B (e.g., a data center selection and/or handoff system residing at and/or coupled to a data center 151-153.) This selection is based at least in part on the locations of the initial participants 101-104. In particular, the selection of an initial data center may be based on a centroid calculated from the locations of participants 101-104 (e.g., as reflected and/or reported by the locations of client devices 131-134.) This centroid may be calculated from the effective locations (and/or distances) of participants 101-104 (e.g., as reflected and/or reported by the locations of client devices 131-134 plus or times a respective effective distance factor).

From among the plurality of data centers, a second data center is selected to host the conference call, wherein the selection is based on a first plurality of effective distances each associated with one of the first plurality of participants (204). For example, conferencing system 100 may select, from among data centers 151-153, a second data center (e.g., data center 152) to host a conference call. This selection may be different from the initial data center selection. This selection may be made by one or more of data centers 151-153, an element of data centers 151-153, or another system not shown in FIGS. 1A-1B (e.g., a data center selection and/or handoff system residing at and/or coupled to a data center 151-153.) The selection of the second data center is based at least in part on the effective locations of participants 101-104. In particular, the selection of the second data center is calculated from the effective locations of participants 101-104 (e.g., as reflected and/or reported by the locations of client devices 131-134 plus or times a respective effective distance factor).

In an embodiment, the respective effective distance factors may be based on one or more of a participant's device/driver type, the participant's network type, the participants connection type, and a participant weighting factor. Examples of device/driver types that may, at least in part, be accounted for by the effective distance factor include whether the device has the latest driver and/or software, the type of operating system running on the device (e.g., Windows vs. Linux), and the device's hardware capability (e.g., 100 MHz processor vs. 1 GHz processor and/or the amount of memory), etc. Examples of network types that may, at least in part, be accounted for by the effective distance factor include whether the participant's device is connected via an open or public Wifi hotspot, and whether the device is connected via a 'partner' hotspot that is optimized to carry real-time (e.g., conference call) traffic. Examples of connection types that may, at least in part, be accounted for by the effective distance factor include wired connections, wireless connections, and the wireless technology (e.g., LTE, CDMA, WiFi, etc.), if any, being used.

The conference call is handed-off to the second data center if the second data center differs from the initial data center (206). For example, if the second data center (e.g., data center 152) is not the data center currently hosting the conference call (e.g., data center 151), the conference call is handed-off to the second data center.

The aforementioned steps may be repeated as participants join and/or leave the conference call. The aforementioned steps may be repeated as participant's profiles change (e.g., a wireless participant's device switches from LTE to CDMA.) Thus, it should be understood that although FIG. 2 is discussed in terms of a first and second data center, the selection and handing-off of the conference to another data center may occur an arbitrary number of times and the selection may be made from an arbitrary number of data centers. In this manner, the data center hosting the conference call should typically be the data center closest to the effective centroid.

Figure 3:
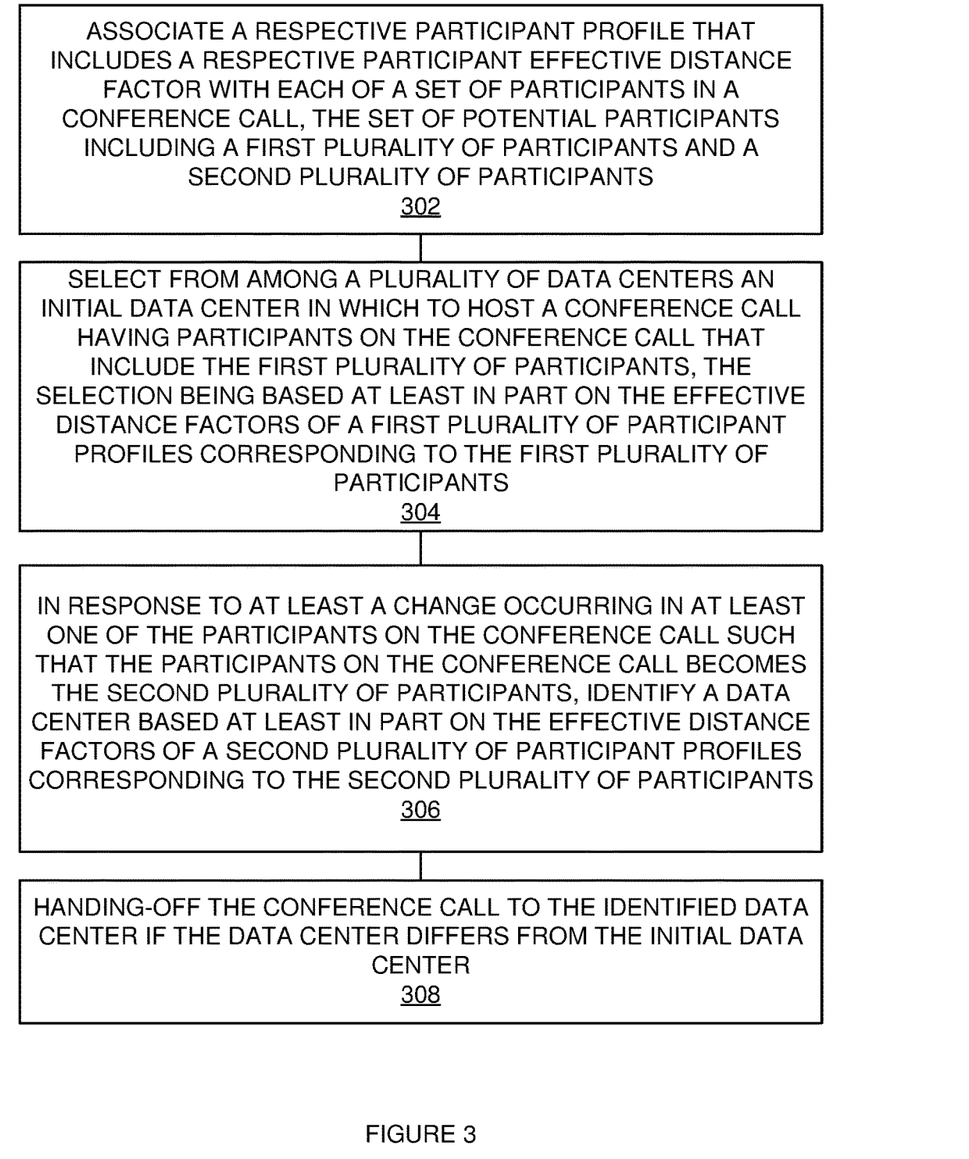
FIG. 3 is a flowchart illustrating a method of handing-off an online conference when participants on the conference change.

FIG. 3 is a flowchart illustrating a method of handing-off an online conference based on effective distances. The steps illustrated in FIG. 3 may be performed by one or more elements of conferencing system 100. A respective participant profile that includes a respective participant effective distance factor is associated with each of a set of participants in a conference call, where the set of potential participants includes a first plurality of participants and a second plurality of participants (302). For example, conferencing system 100 may generate and/or maintain participant profiles for each of client devices 131-134. These participant profiles may include, for example, information about geographic location, device type, network type, connection type, weighting factors, and/or anticipated location (e.g., a location drawn from a user's calendar program.) These participant profiles may be used to generate and/or maintain an effective distance factor based on the other information in the participant's profile. The information in a participant profile may be reported by client devices 131-134.

From among a plurality of data centers, an initial data center in which to host a conference call having participants on the conference call that include the first plurality of participants is selected where the selection is based at least in part on the effective distance factors of a first plurality of participant profiles corresponding to the first plurality of participants (304). For example, based on one or more of a geographic location, a device type, a network type, a connection type, weighting factors, and/or an anticipated location stored in a participant's profile, conference system 100 may calculate an effective distance factor to associate with that participant. Based on this effective distance factor, and the effective distance factors of the other participant's scheduled to be on the conference call (e.g., the first plurality of participants), conferencing system 100 may select an initial data center (e.g., data center 151) to host the conference call.

This selection of an initial data center may be made before the conference begins. For example, several minutes (e.g., 3) before the conference is to begin, conference system 100 may select an initial data center based on the anticipated locations of the participants. Conference system 100 may determine the anticipated locations of the participants based on a location associated a participant's profile, and/or a scheduled location (e.g., meeting room) received from the participant's calendar. For example, if a participant has accepted a meeting request for a conference that specifies the participant will attend the conference in a meeting room away from their normal location (e.g., desk), conference system 100 may assume that this participant is going to be located in the conference room for the initiation (and duration) of the conference.

In response to at least a change occurring in at least one of the participants on the conference call such that the participants on the conference call becomes the second plurality of participants, a data center is identified based at least in part on the effective distance factors of a second plurality of participant profiles corresponding to the second plurality of participants (306). For example, in response to participant 104 leaving the conference, and based on one or more of a geographic location, a device type, a network type, a connection type, weighting factors, and/or an anticipated location stored in each remaining participant's profile, conference system 100 may calculate an effective centroid and corresponding effective distance factors to associate with each remaining participant (e.g., the second plurality of participants). Based on these effective distance factors, conferencing system 100 may identify a second data center (e.g., data center 152) to host the conference call.

In another example, in response to a new participant joining the conference, and based on one or more of a geographic location, a device type, a network type, a connection type, weighting factors, and/or an anticipated location stored in the new participant's profile, conference system 100 may calculate an effective centroid and corresponding effective distance factors to associate with the new participant. Based on these effective distance factors, conferencing system 100 may identify a second data center (e.g., data center 152) to host the conference call.

The conference call is handed-off to the identified data center if the data center differs from the initial data center (308). For example, based on data center 152 being identified as the data center to host the conference call because of a change in the participants on the conference call, conference system 100 may hand-off the conference call to data center 152.

Figure 4:
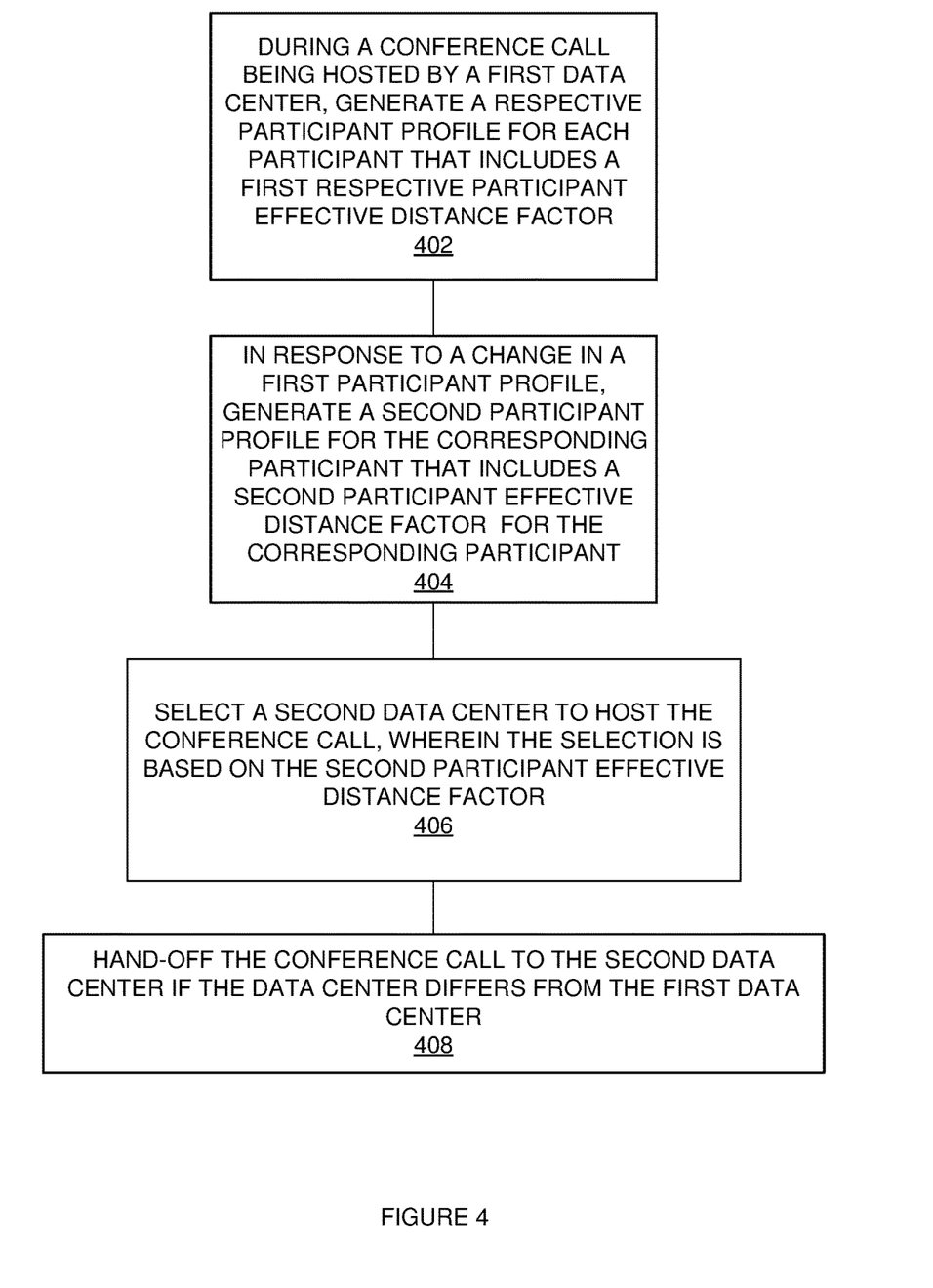
FIG. 4 is a flowchart illustrating a method of handing-off an online conference when an effective distance of a participant changes.

FIG. 4 is a flowchart illustrating a method of handing-off an online conference when an effective distance of a participant changes. The steps illustrated in FIG. 4 may be performed by one or more elements of conferencing system 100. During a conference call being hosted by a first data center, a respective participant profile is generated for each participant that includes a first respective participant effective distance factor (402). For example, while data center 152 is hosting a conference call with users 101-104 participating, conference system 100 may generate participant profiles that include the effective distance factors illustrated by arrows 171-174. The participant profiles may also include location information illustrated by arrows 161-164.

The participant profiles may include other information used to determine the effective distance factors for client devices 131-134. For example, for each of client devices 131-134 (and thus for each of participants 101-104), a participant profile may include information on one or more of a geographic location, a device type, a network type, a connection type, weighting factors, and/or an anticipated location stored in a participant's profile. Based on the information in the participant profiles, conference system 100 may calculate the effective distance factors to associate with each respective participant profile.

In response to a change in a first participant profile, a second participant profile is generated for the corresponding participant that includes a second participant effective distance factor for the corresponding participant (404). For example, if client device 133 changes connection type from LTE to CDMA, conference system 100 stores this information in participant 103's profile and also updates the effective distance factor (173) associated with participant 103. In another example, if client device 133 changes location, conference system 100 stores the new location information in participant 103's profile and also updates the effective distance factor (173) associated with participant 103. In another example, if client device 133 is scheduled to change location (e.g., according the participant 103's calendar), conference system 100 may store the anticipated new location information in participant 103's profile and schedule a corresponding update to the effective distance factor (173) associated with participant 103 to occur at the scheduled time of the location change (or somewhat before).

A second data center is selected to host the conference call, wherein the selection is based on the second participant effective distance factor (406). For example, when conference system 100 updates participant 103's profile with a new effective distance factor, conference system 100 may determine that a different data center (e.g., data center 151) is now closest to an updated effective distance centroid 181. In this case, conference system 100 may select data center 151 to host the conference call.

The conference call is handed-off to the second data center if the data center differs from the first data center (408). For example, based on a determination that data center 151 is now closest to the updated effective distance centroid 181, and that data center 152 is currently hosting the conference call, conference system 100 may hand-off the conference call to data center 151.

Figure 5:
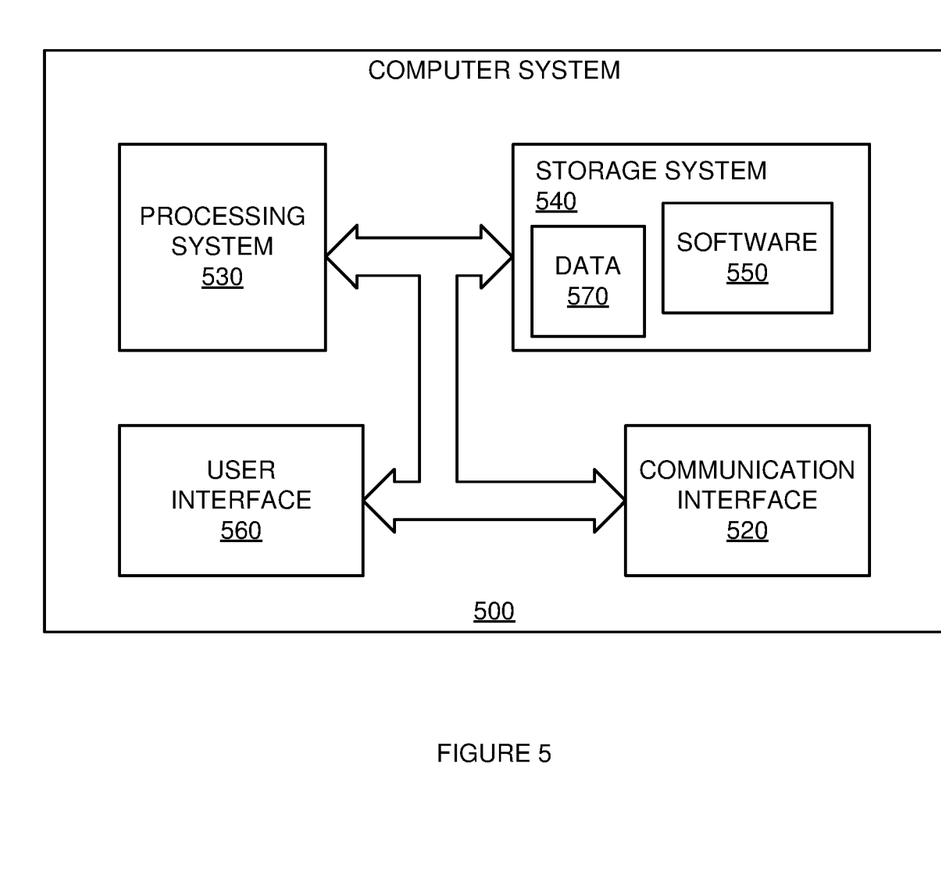
FIG. 5 is a block diagram illustrating a computer system.

FIG. 5 is a block diagram illustrating a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of conference system 100, and its components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Implementations discussed herein include, but are not limited to, the following examples:

Example 1

A method of selecting a data center to host a conference call, comprising: selecting, from among a plurality of data centers, an initial data center to host a conference call having participants on the conference call that include a first plurality of participants each associated with one of a first plurality of participant locations, the selection being based at least in part on the first plurality of participant locations; and, selecting, from among the plurality of data centers, a second data center to host the conference call, the selection being based on a first plurality of effective distances each associated with one of the first plurality of participants.

Example 2

The method of example 1, wherein the first plurality of effective distances are based at least in part on device types associated with each of the first plurality of participants.

Example 3

The method of example 1, wherein the first plurality of effective distances are based at least in part on network types associated with each of the first plurality of participants.

Example 4

The method of example 1, wherein the first plurality of effective distances are based at least in part on connection types associated with each of the first plurality of participants.

Example 5

The method of example 1, wherein the first plurality of effective distances are based at least in part on weighting factors associated with each of the first plurality of participants.

Example 6

The method of example 1, wherein the first plurality of effective distances are based at least in part on a packet error rate associated with each of the first plurality of participants.

Example 7

The method of example 1, further comprising: further comprising: in response to at least a change occurring in at least one of the participants on the conference call such that the participants on the conference call becomes a second plurality of participants, identify, based at least in part on the effective distance factors of a second plurality of participant profiles corresponding to the second plurality of participants, a third data center; and, handing-off the conference call to the third data center if the third data center differs from the second data center.

Example 8

A communication system, comprising: an initial data center of a plurality of data centers to initially host a conference call having participants on the conference call that include a first plurality of participants each associated with one of a first plurality of participant locations, a selection of the initial data center being based at least in part on the first plurality of participant locations; and, a handoff system to select an identified data center from the plurality of data centers based on effective distances between each of the first plurality of participants and the identified data center, the identified data center to host the conference call.

Example 9

The communication system of example 8, wherein the selection of the identified data center is based on a first centroid determined from effective distances between each of the first plurality of participants and the identified data center.

Example 10

The communication system of example 9, wherein the selection of the initial data center is based on a second centroid determined from the first plurality of participant locations.

Example 11

The communication system of example 8, wherein the effective distances between each of the first plurality of participants and the identified data center are based at least in part on weighting factors associated with each of the first plurality of participants.

Example 12

The communication system of example 8, wherein the effective distances between each of the first plurality of participants and the identified data center are based at least in part on connection types associated with each of the first plurality of participants.

Example 13

The communication system of example 8, wherein the effective distances between each of the first plurality of participants and the identified data center are based at least in part on network types associated with each of the first plurality of participants.

Example 14

The communication system of example 8, wherein the effective distances between each of the first plurality of participants and the identified data center are based at least in part on device types associated with each of the first plurality of participants.

Example 15

A non-transitory computer readable medium having instructions stored thereon for selecting a data center to host a conference call that, when executed by a computer, at least instruct the computer to: receive effective distance information about each of a plurality of participants that are on the conference call, the effective distance information associating each combination of each of the plurality of participants and a plurality of data centers to a respective effective distance indicator; and, based on the effective distance indicators for a data center of the plurality of the data centers, select the data center to host the conference call.

Example 16

The computer readable medium of example 15, wherein the computer is further instructed to: generate the respective effective distance indicators based at least in part on device type information received from the plurality of participants.

Example 17

The computer readable medium of example 15, wherein the computer is further instructed to: generate the respective effective distance indicators based at least in part on network type information received from the plurality of participants.

Example 18

The computer readable medium of example 15, wherein the computer is further instructed to: generate the respective effective distance indicators based at least in part on weighting factors associated with each of the first plurality of participants.

Example 19

The computer readable medium of example 15, wherein the computer is further instructed to: generate the respective effective distance indicators based at least in part on network connection type information received from the plurality of participants.

Example 20

The computer readable medium of example 15, wherein the effective distance indicators correspond to a centroid based on the location of each of the plurality of participants and one or more of: device type information, network type information, weighting factors associated with the first plurality of participants, and network connection type.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A management system configured to manage data centers hosting a communication session among a plurality of participant devices, the management system comprising:
 a data center selection system including:
  one or more processors;
  a memory having stored thereon instructions that when executed by the one or more processors cause the data center selection system to:
   select a first data center from a plurality of data centers to initially host the communication session based on a first set of effective distances between a group of participants of the communication session and the first data center; and
   select, in response to a detection of a change in a composition of participants in the group of participants or change in connectivity between the plurality of participant devices and the first data center, a second data center to host the communication session based on a second set of effective distances.

2. The management system of claim 1, wherein the data center selection system sends a request to the first data center to handoff the communication session to the second data center when the first data center is different than the second data center.

3. The management system of claim 1, wherein the data center selection system is part of one or more of the plurality of data centers.

4. The management system of claim 1, wherein the first set of effective distances is based, at least in part, on a combination of distances between the plurality of data centers and participant locations modified by effective distance factors corresponding to each participant in the group of participants.

5. The management system of claim 4, wherein each effective distance factors is based, at least in part, on device type, network type, packet error rate, or connection type associated with a participant in the group of participants.

6. The management system of claim 5, wherein the effective distance factors include a participant weighting factor that is different for a media presenter and a listen-only participant.

7. The management system of claim 1, wherein each participant in the group of participants is associated with a participant profile that includes an initial effective distance factor based on an anticipated geographic location or participant weighting factor.

8. A method for operating a communication system, the method comprising:
   selecting an initial data center to initially host a communication session between a first group of participants;
      wherein the initial data center is selected to initially host the communication session based, at least in part, on a first set of effective distances; and
   selecting a second data center to host the communication session based on an updated set of effective distances between a second group of participants and the second data center.

9. The method of claim 8, further comprising sending a request to the initial data center to handoff the communication session to the second data center when the initial data center differs from the second data center.

10. The method of claim 8, wherein at least one effective distance in the first set of effective distances is modified by an effective distance factor based, at least in part, on device type, network type, packet error rate, or connection type associated with a participant in the first group of participants.

11. The method of claim 8, wherein at least one effective distances in the first set of effective distances is modified by an effective distance factor that includes a participant weighting factor.

12. The method of claim 11, wherein the participant weighting factor is different for a media presenter and a listen-only participant.

13. The method of claim 8, further comprising:
   in response to at least a change occurring in at least one of the participants in the communication session such that the second group of participants becomes a third group of participants, identifying, based at least in part on effective distance factors of a third group of participant profiles corresponding to the third group of participants, a third data center; and,
   handing-off the communication session to the third data center when the third data center differs from the second data center.

14. The method of claim 8, wherein first group of participants include participants scheduled to participate in the communication session and where selecting the initial data center is completed before the communication session begins based on the participants scheduled to participate in the communication session.

15. A system comprising:
   a means for determining effective distance information about each of a plurality of participants that are participating in a communication session;
      wherein the effective distance information associates each combination of each of the plurality of participants and a plurality of data centers to a respective effective distance indicator; and,
   a means for selecting a data center to host the communication session based on the effective distance indicators.

16. The system of claim 15, further comprising a means for generating the respective effective distance indicator based at least in part on device type information, network type information, or connection type information received from the plurality of participants.

17. The system of claim 15, further comprising a means for generating the respective effective distance indicators based at least in part on weighting factors associated with each of the plurality of participants.

18. The system of claim 15, wherein the effective distance indicators correspond to a centroid based on a location of each of the plurality of participants and one or more of: device type information, network type information, weighting factors associated with the plurality of participants, or network connection type.

19. The system of claim 15, wherein the data center is an initial data center selected before the communication session is initiated.

20. The system of claim 15, wherein the data center is a first data center and the system further comprising:
   a means for selecting a second data center during the communication session; and
   a means for handing off the communication session from the first data center to the second data center.

* * * * *